July 16, 1929.  W. H. KNISKERN  1,721,455
ART OF TREATING SYNTHESIS GASES OF SYNTHETIC AMMONIA
PLANTS AND APPARATUS THEREFOR
Filed Dec. 13, 1923
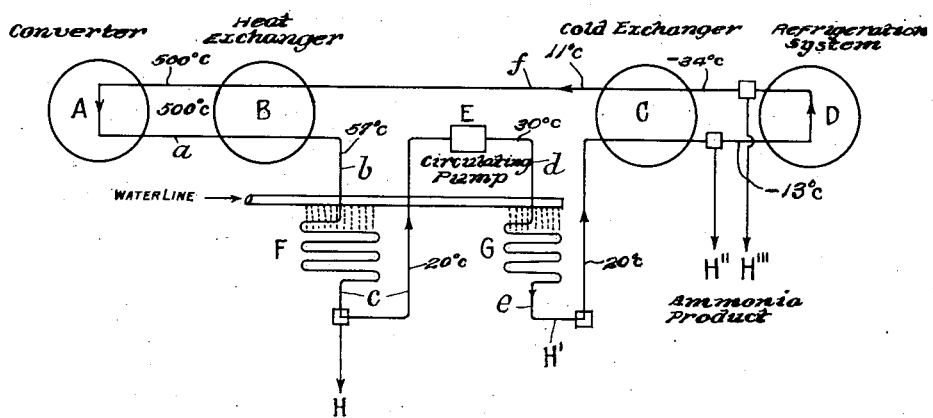
WITNESS
INVENTOR
WALTER H. KNISKERN
BY
ATTORNEYS Patented July 16, 1929.

1,721,455

UNITED STATES PATENT OFFICE.

WALTER H. KNISKERN, OF SYRACUSE, NEW YORK, ASSIGNOR TO ATMOSPHERIC NITROGEN CORPORATION, OF SOLVAY, NEW YORK, A CORPORATION OF NEW YORK.

ART OF TREATING SYNTHESIS GASES OF SYNTHETIC-AMMONIA PLANTS AND APPARATUS THEREFOR.

Application filed December 13, 1923. Serial No. 680,567.

The invention relates to the treatment of gases which are the result of synthesis of hydrogen and nitrogen under pressure in the presence of a suitable catalyst and the object of the invention is to deal with the gases flowing from the converter in such a manner as to bring about substantial economies and advantages over known practice prevailing at this portion of a synthetic ammonia plant.

The synthetic ammonia process to which this invention is particularly applicable is a process wherein nitrogen and hydrogen in the proportion of 1:3 are subjected to pressure for example of approximately 95 atmospheres, and under said pressure passed in contact with a catalyst with the resultant conversion of a part of the nitrogen-hydrogen gas to ammonia, $NH_3$. The gases from the converter may thus be regarded as a relatively very dilute ammonia gas, the diluent being mainly gaseous nitrogen and hydrogen in the proportion of 1:3. In order to extract the ammonia from these converter gases, it is the general practice to subject them to refrigeration and elaborate and expensive refrigerating systems are required for this purpose. An efficient refrigerating procedure is that shown in my Patent No. 1,690,585, issued Nov. 6, 1928.

A carefully regulated, uniform and relatively high temperature condition is required in the ammonia converter for efficient operation. To maintain this desired temperature condition the gases entering the converter are usually pre-heated to a relatively uniform and predetermined elevated temperature by passing them in heat-exchange relation with the hot converter gas from the converter. The gases from the converter, after having ammonia extracted by the refrigerating or ammonia liquefaction system, are suitable for further treatment in the converter and consequently are preferably led from the refrigerating system back into and through the same or another converter. In the former case fresh nitrogen-hydrogen gases of 1:3 composition are added. For the purposes of the present application it is immaterial at what point the stream of fresh gases joins the gas which has passed through the converter and this junction may be effected before, in or after the refrigerating stage.

It will be observed from the foregoing description that the essential elements of that part of the synthetic ammonia system with which this invention is concerned comprise a converter and a refrigerating system (and preferably an intermediate heat interchanger) and gas lines leading into and through the converter and thence into and through the refrigerating system. I have now discovered that by applying water cooling or its equivalent to that part of the described gas lines which is about to enter the refrigerating system, advantages of astonishing substantiality result. The gases are on their way to a refrigerating system and must undergo refrigeration in any event, so that this preliminary water cooling is apparently merely an added operating expense and an unnecessary complication of the process, especially as any apparatus for such cooling must be designed to withstand the high operating pressure of about 100 atmospheres. Quite on the contrary, however, experience has demonstrated that such preliminary cooling results in tangible economies amounting to many thousands of dollars per year according to the size and output of the plant in which it is applied.

The preferred synthetic ammonia system is one in which the unconverted nitrogen-hydrogen gases are returned to the converter in admixture with suitable amounts of fresh gas and the accompanying drawing depicts apparatus suitable for the new process in connection with such preferred procedure. The temperature legends applied to this drawing are manifestly to a large extent merely illustrative and indicative of but one of a large number of possible temperature conditions.

In that drawing A represents the ammonia converter, B the heat interchanger, D the liquefier or refrigerating system and C a so-called cold interchanger which, for the purposes of this invention, may be regarded as a part of the refrigerating system. The gas line represented by the letters $a$, $b$, $c$, $d$ and $e$ represent the line through which the gases flow from the converter A to the refrigerating system C, D. The line $f$ represents the gas line from the refrigerating system back to the converter A. In the gas line $a$, $b$, $c$, $d$, $e$ and between the interchangers B and C the gas line is developed as a coil F. E is a circulating pump or compressor and G is a second coil in the gas line. At H, H', H" and H'" are indicated certain points in the system where provision is made for the withdrawal of accumulated liquefied ammonia. The coils F and G are to be regarded as cooled by water or as exposed to an equivalent fluid.

In practice the coils may be installed in the open without any housing so that the water may exert its full cooling effect and so that the cooling action of the outside air which in winter is considerable and may alone be sufficient, is obtained. In the drawing many details have obviously been omitted, such, for example, as a showing of any oil filters between the circulating pump or compressor E and the cooling coil G. Nor has the point of introduction of the fresh or make-up gas been indicated, nor the point of bleeding, nor many other details of a like general nature, which are understood by those skilled in the art as being involved in a plant of the type shown in the drawing.

In the preferred operation with a plant such as described the extent of the reaction in the converter A is such that the heat of reaction produced in A is in excess of the heat lost from the system A+B by radiation, convection, etc. This means that the gas flowing from A through B will, upon leaving the last of the heat interchangers B, still have a temperature considerably higher than that of the gas entering B through $f$. The gases from the converter by the time they leave the last exchanger of the heat exchanger system B have given up their high temperature heat to the gases flowing in the opposite direction and the residual low temperature heat can no longer, because of its low temperature, be transferred to more than a relatively small extent to the incoming gases and therefore cannot be economically utilized by merely increasing the number of heat exchangers. This residual heat at this point, that is at $b$, is a low temperature heat, by which is meant a temperature which, while higher than normal atmospheric temperature, is less than 100° C.

In the specific instance under consideration the low temperature heat, that is at $b$, may, for the purpose of illustration, be considered as 57° C. According to prevailing practice this gas at said temperature is passed through the cold interchanger C counter-current to the cold gases from the liqufier D and thence into the liquefier or refrigerating system D. As the result of the use of the cooling coil F the temperature of 57° C. prevailing at $b$ is reduced to approximately atmospheric temperature (say 20° C. in summer) at $c$. The gases from $c$ at said temperature enter the circulating pump E with the result that the heat of compression again elevates the temperature of the gas at $d$ to say about 30° C. The cooling coil G again reduces the temperature of the gases at $e$ so that they will have substantially the same temperature as the gases at $c$. The remaining flow and treatment of the gases remains the same as in the prior practice. It will be observed that the function of the coils F and G is to remove heat of reaction produced in A and heat of compression produced in E, both by means of an inexpensive cooling fluid instead of by expensive refrigeration as conducted in C and D. The advantages that flow from the new procedure of this invention are readily observable from the following table:

Upon the basis of a given gas flow, the heat removed by the coil F (considering the gas at $b$ as having a temperature of 57° C. and at C as 21° C.) _____ = 16,100 B.t.u. per minute.

The heat removed by coil G, (assuming 30° C. at $d$ and 20° C. at $e$) ___ = 4,900

Total_____ 21,000

While the total refrigeration used is_ = 16,000

Total heat to be removed___ = 37,400

In other words $\frac{21000}{37400}$ or 56% of the total heat is removed by cooling water or its equivalent and the cost of refrigeration which would otherwise be necessary is correspondingly decreased. Based on a refrigerating system such as is shown in Fig. 1 of my Patent No. 1,690,585, issued Nov. 6, 1928, the foregoing represents, upon the basis of the assumption of the foregoing table, a saving of about $16,000 per year, and on the basis of Fig. 3 of said application, a saving of about $11,000 per year will result.

The cooler G or the cooler F may be omitted but it is preferable to use both.

If the compressor E is located at some other point in the gas line than that illustrated in the drawing, the coils F and G will be constituted of but a single coil of appropriate dimensions. Air coolers would obviously function in the same way as the water coolers, provided air of sufficiently low temperature was naturally and inexpensively available. Refrigeration could also be saved by removing heat by means of an air-cooled gas coil placed between the converter A and the heat interchanger B or between any two adjacent heat exchangers, but in this way the excess heat would be removed as high temperature heat and the transfer efficiency of the heat interchangers would be thereby lowered.

My invention can also be used to advantage in those cases where the heat lost from the system A+B is greater than the heat of reaction and in which additional heat from an electric source or otherwise is applied to the converter A or to the gas before entering A. In such cases the temperature of the gas leaving the last of the hot interchangers is also usually substantially higher than that of the gas entering B because of the practical difficulty of designing heat interchangers which will efficiently transfer the low temperature heat from the converter gases to the gas entering B through $f$. The expression "low temperature heat" as heretofore employed is used in contrast to the high temperature heat condition which exists in the gas stream at the moment when it leaves the catalyst in the converter A or during its heat transferring travel through the heat exchange system B. In other words, the expression "low temperature heat" refers to such heat as is present in the gas stream (whatever it may be in degrees centigrade) in the line leading from B to C.

It is thus seen that my invention consists essentially of a process and apparatus therefor whereby at a special stage of the synthetic ammonia process the heat removing property of naturally available cooling mediums such as water are first utilized, followed by what might be called "artificial" or "mechanical" cooling means, to produce the desired low temperature. By artificial or mechanical cooling means I mean those arrangements or systems which require for their operation considerable expenditure of energy, e. g., ammonia refrigeration systems, both of the compression and absorption type, the cyclic compression and expansion of gases, etc., all in contrast to those cooling means whose use requires no equivalent or corresponding energy consumption.

It is preferable to remove as much heat as possible in the first cooler F since heat removed at this point decreases the temperature of the gas entering the compressor E and so decreases the power required for the operation of the compressor E. Upon the basis of the temperatures stated in the foregoing table, and ammonia conversion of 8% by volume in A, there will be practically no liquefaction of ammonia at H. However if the ammonia conversion under certain circumstances is substantially higher than 8% or where a low cooling water temperature is available (as in winter) some of the ammonia may be liquefied in the coolers F and G and provision has been made to withdraw this liquefied ammonia fraction at H and H'. Obviously, when any ammonia is thus liquefied, there will be a saving of an equivalent amount of refrigeration which would otherwise be necessary.

I claim:

1. The combination of an ammonia converter, a heat-exchange system, a refrigerating system for liquefying the ammonia produced in the converter, and temperature reducing means in which the cooling medium is at prevailing natural temperatures interposed between the heat-exchange system and the refrigerating system in the gas line leading from the former to the latter and anterior to its entrance into the latter for removing low temperature heat from the gas in said line at said point.

2. The combination of an ammonia converter, a heat-exchange system, a refrigerating system for liquefying the ammonia produced in the converter, and temperature reducing means in which the cooling medium is at prevailing natural temperatures interposed between the heat-exchange system and the refrigerating system in the gas line leading from the former to the latter and anterior to its entrance into the latter, for removing low temperature heat from the gas in said line at said point, said cooling medium compressing water.

3. The combination of an ammonia converter, a heat-exchange system, a refrigerating system for liquefying the ammonia produced in the converter, a circulating compressor between the heat-exchange system and the refrigerating system, and temperature reducing means in which the cooling medium is at prevailing natural temperatures interposed between the heat-exchange system and the compressor in the gas line leading from the former to the latter for removing low temperature heat from the gas in said line at said point.

4. The combination of an ammonia converter, a heat-exchange system, a refrigerating system for liquefying the ammonia produced in the converter, a circulating compressor between the heat-exchange system and the refrigerating system, temperature reducing means in which the cooling medium is at prevailing natural temperatures interposed between the heat-exchange system and the compressor in the gas line leading from the former to the latter, for removing low temperature heat from the gas in said line at said point, and additional temperature reducing means of similar character to the first named means between the compressor and the refrigerating system for removing from the gas at said point heat of compression produced in the compressor.

5. That improvement in the art of treating ammonia synthesis gas which comprises transferring a portion of the heat of the converter gas to gases on their way to synthesis, then removing further heat from the converter gas by temperature reducing means in which the cooling medium is at prevailing natural temperatures and then passing the gas thus cooled to the refrigerating system in which artificial refrigeration effects liquefaction of ammonia of the converter gas.

6. That improvement in the art of treating ammonia synthesis gas which comprises transferring a portion of the heat of the converter gas to gases on their way to synthesis, then removing further heat from the converter gas by water-cooling, with flowing cool water, having a natural (as distinguished from artificial) cool temperature and then passing the gases thus cooled to the refrigerating system in which artificial refrigeration effects liquefaction of ammonia of the synthesis gas.

7. That improvement in the art of treating ammonia synthesis gas which comprises transferring a portion of the heat of the converter gas to gases on their way to synthesis, then removing further heat from the converter gas by temperature reducing means in which the cooling medium is at prevailing natural temperatures, and then subjecting the gases thus treated to artificial refrigeration, separating the liquefied ammonia and passing the remaining gas to synthesis as previously described.

8. That improvement in the art of treating ammonia synthesis gas which comprises transferring a portion of the heat of the converter gas to gases on their way to synthesis, then removing further heat from the converter gas by temperature reducing means in which the cooling medium is at prevailing natural temperatures, then subjecting the gas thus treated to compression, then removing the heat of compression also by a natural cooling means and then subjecting the gases thus treated to artificial refrigeration, separating the liquefied ammonia and passing the remaining gas to synthesis as previously described.

In testimony whereof I have hereunto set my hand.

WALTER H. KNISKERN.